Patented June 25, 1940

2,205,417

UNITED STATES PATENT OFFICE 2,205,417

NITROSAMINE ADDITION PRODUCT

Jean G. Kern, Hamburg, N. Y., assignor to National Aniline & Chemical Company, Inc., New York, N. Y., a corporation of New York No Drawing. Application September 5, 1933, Serial No. 688,194. Renewed October 6, 1937

29 Claims. (Cl. 8—45)

This invention relates to the art of dyeing and coloring and to new compounds or compositions useful in connection therewith, their manufacture and use. It relates especially to addition products or compositions of the soluble nitrosamines or diazotates and the soluble acid ester salts of poly-hydroxy inorganic acids.

The present application is in part a continuation of my copending application, Serial No. 673,031, filed May 26, 1933.

The metal salts of nitrosamines or diazotates derived from primary aromatic amino compounds are frequently employed with or without coupling components or developers for the production of dye pastes or powders for use in the art of dyeing and of printing textile fibres. These compositions, however, especially those containing coupling components, are subject to decomposition resulting in loss or alteration of active dye intermediate whereby loss in strength or change in tint, and/or irregular shades are obtained by their use.

Also, such dye intermediates as well as the dyeing or printing compositions made therefrom, are not always as soluble as might be desired in water or other solvents, especially in printing pastes and dye liquors. Rapid and complete dissolution is desirable whether the intermediates are employed in a bath or in a paste, for in the one case time is lost through extra manipulation and hence the output of equipment is correspondingly reduced, and in the other case irregularities in dyeing and in printing with resulting loss in brilliancy of the shades may result.

It is also known that there is a considerable hazard connected with the manufacture of the metal salts of the nitrosamines derived from the aromatic primary amines, particularly in the dry state, due to their more or less spontaneous decomposition, and, further, that such nitrosamines, even when admixed with coupling components, or developers adapted to form azo compounds therewith, are often liable to violent decomposition when exposed to the action of heat and steam.

It is an object of the present invention to provide dye compositions of greater stability and better solubility than former nitrosamine or diazotate dye compositions.

It is also an object of the invention to provide dye compositions giving exceptionally brilliant and fast shades.

It is also a further object of the invention to decrease the hazards involved in the manufacture of the soluble metal salts of N-nitrosamines derived from the aromatic primary amines, by increasing their stability at or during the time of manufacture, and to produce said nitrosamines in the form of a paste or powder which is preferably free from a large excess of free caustic alkali.

In particular, this invention relates to the preparation of products from the nitrosamines or their isomers, the diazotates, of the general formulae

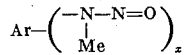

and

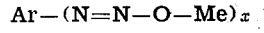

which may be represented generically by the formula $Ar-[(NNO)Me]_x$ whether of the active or non-active (syn or anti) coupling form, wherein Ar designates the residue of a diazotizable aromatic amine $Ar-(NH_2)_x$, which residue may comprise single, condensed, or linked nuclei, particularly a residue of the benzene, naphthalene, anthracene or carbazole series; and Me represents the residue of a base, either organic or inorganic, and in particular a metal conferring solubility in water, such as an alkali metal, and $x$ may be 1, 2, or 3 (usually less than 3 and preferably 1).

In accordance with my invention, there is added to a nitrosamine or diazotate of this type a soluble salt of an acid ester of an inorganic acid, and more particularly of an acid ester of a polyhydroxy inorganic acid having the following formula $R_z$—A—$M_{(n-z)}$ where R denotes a hydrocarbon radical, which may contain hydroxyl and/or other substituents, said radical being the residue of a monohydric or polyhydric alcohol resulting from the subtraction of an alcoholic OH group; A stands for the hydrogen-free radical of a polyhydroxy inorganic acid (as for example $SO_4$, $SO_3$, $PO_4$, $PO_3$, $BO_3$, $SiO_3$, $SiO_4$, etc.); $n$ designates the number of replaceable acidic hydrogen atoms present in said polyhydroxy acid, that is, the number 2, 3, or 4; $z$ equals a number having a lesser value than $n$; and M denotes an alkali metal. I have found that the addition of such esters to said nitrosamines or diazotates greatly increases the stability of the latter toward decomposition and toward coupling components and also provides a product of high solubility especially in printing pastes, yielding exceptionally brilliant and fast shades.

The products of the present invention are preferably prepared by heating a solution containing the nitrosamines and the ester salts. Any suitable solvent may be employed, i. e., any solvent in which both of the compounds are soluble, for example, water or ethyl or methyl alcohol or mixtures thereof. Some of the products may be obtained in the cold by long standing of such a solution. The products may be recovered and isolated from their concentrated solutions in any suitable manner, as for example, by crystallization from the solution followed by filtration or by evaporation of the solution to dryness. In the former case the wet press-cakes may be dried by the addition of any suitable dehydrating agent, for example, fully or partially dehydrated trisodium phosphate, sodium acetate, or sodium sulfate.

Products of increased stability may be obtained merely by adding one of the above mentioned acid ester salts to an aromatic nitrosamine or diazotate, for example, by adding the acid ester salt to a printing paste containing an aromatic nitrosamine or diazotate.

The complex dye products or compositions of my invention may be represented by the general formula $$[Ar(NNOMe)_x]_y - [R_z - A - M_{(n-z)}]_{y'}$$

wherein the symbols have the above ascribed values, $y$ and $y'$ are finite quantities, and preferably each equals 1.

While the exact structural formulae of the compounds of the present invention are not known, it appears that the optimum stability is obtained when the nitrosamine and partial ester salt are present in equimolar proportions. However, the benefits of the invention are obtained with a molecular ratio of nitrosamine to partial ester salt either above or below 1—1.

Examples of ester salts that may be used within the purview of the present invention are the partial ester salts of sulfuric, boric, phosphoric, phosphorous, silicic, and sulfurous acids. The partial ester salts of sulfuric, boric, and phosphoric acids have a greater stability towards hydrolysis than those of the other acids mentioned, and these are preferred.

The alcohol residue in the ester salt is preferably that of an alkyl, cyclo-alkyl, or aralkyl alcohol, which, however, may be further substituted and may be a monohydroxy or polyhydroxy alcohol. It will be understood therefore that in the following discussion and in the claims the term "alkyl" is intended to designate an aliphatic radical which, however, may have substituent groups joined thereto. The alcoholic residue may be, for example, an alkoxy-alkyl or aryloxy-alkyl group, or may contain more than one of such groups. The alcohol residue of the ester salt or partial ester may be that of an alcohol of any type whether carbocyclic or heterocyclic or hetero-acyclic, monohydroxy or polyhydroxy, unsubstituted, or substituted by any organic or inorganic group, but if substituted, it is preferably substituted by a carboxylic and/or a sulfonic group.

As examples of acid ester salts which are suitable for use in the present invention may be mentioned: ethyl potassium sulfate, isopropyl sodium sulfate, butyl sodium sulfate, isobutyl sodium sulfate, amyl sodium sulfate, cetyl sodium sulfate, cyclohexyl sodium sulfate, glycerin disodium monophosphate, diethylene glycol disodium disulfate, isopropyloxy-ethyl sodium sulfate, sodium sulfate of diethylene glycol monoethyl ether, potassium sulfate of diethylene glycol monoethyl ether, triethylene glycol potassium monosulfate, N-n-butyl-amino-ethyl sodium sulfate, the soluble salts of acid sulfuric esters of mono-ethanolamine, N-beta-ethyl-hexyl-N-mono-ethanolamine, N-cyclo-hexyl-N-mono-ethanolamine, N-cyclo-hexyl-N-diethanolamine, N-hydroxy-ethyl-N-tetra-hydronaphthylamine, N-cetyl-N-ethanolamine, monohydroxy-ethyl-ether of N-di-n-butyl-N-hydroxyethylamine, or N-n-butyl-N-hydroxy-isopropylamine, or sodium (or potassium) diglyceryl monoborates, N-cyclohexyl-N-hydroxy-isopropyl amine disodium phosphate or mono sodium phosphate.

An aryl-amino ethyl sulfate likewise may be employed: for example compounds of the general formula:

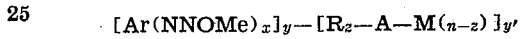

or

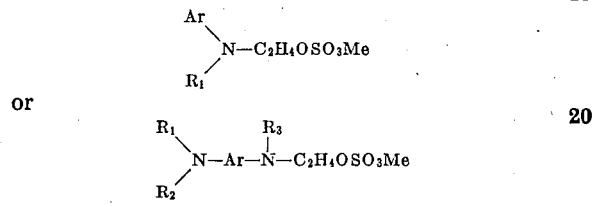

where Ar designates an aryl group, which may be substituted or unsubstituted, $R_1$, $R_2$, and $R_3$ may be an alkyl, hydroxy-alkyl, aralkyl, or aryl group or may be an ethyl sulfate group, $-C_2H_4-O-SO_3Me$, and $R_1$, $R_2$, and $R_3$ may be the same group or different groups; Me may be a metal, for example, sodium or potassium. Such compounds preferably should contain substituents in the ring to prevent coupling, i. e., should be of the class of aromatic amines designated as the non-coupling type, as otherwise during the acid after-treatment such amines would couple with the regenerated normal diazotate and would yield soluble azo dyes, impairing the shades and diminishing the yield of the desired dyes.

The organic esters of polyhydroxy inorganic acids have a multiple effect when employed in nitrosamine or diazotate pastes and not only provide a product that is remarkably stable, especially when admixed with neutral or alkaline soluble salts of developers but these partial ester salts, especially the lower alkyl sulfates (wherein the alkyl group contains five or less carbon atoms) are in themselves excellent printing assistants.

The inorganic ester salts are also advantageous in the preparation of printing powders prepared from a nitrosamine and a developer or its sodium salt.

Printing pastes prepared from the products of the present invention may be developed by after-treatment, according to any of the standard methods known to the art for the production of fast shades with nitrosamines.

The following are examples of compositions prepared in accordance with the present invention:

*Example 1.*—The nitrosamine sodium salt of 2.5-dichlor aniline was prepared in ordinary manner by treating 2.5-dichlor benzene diazonium chloride with an excess of sodium hydroxide; filtering off the nitrosamine thus formed and treating the product with about 30% thereof (by weight) of anhydrous trisodium phosphate to dehydrate the product. The dry product thus formed contained about 30 to 35% of sodium 2.5-dichlor aniline nitrosamine, between 3 and 4% of free sodium hydroxide; the remainder being trisodium phosphate hydrate and sodium chloride together with the usual small amounts of other impurities.

640 parts of this dry product containing an amount of the sodium nitrosamine corresponding to about 162 parts of dichlor aniline were dissolved in 1000 parts of ethyl alcohol and heated to about 45 to 50° C. The resultant solution was filtered at this temperature to remove the insoluble inorganic salts. To the filtered solution was added 175 parts of isobutyl sodium sulfate. After solution of the sulfate was complete, the alcoholic solution was heated to a temperature of about 65° C. over a period of about 45 minutes. The solution was then cooled slowly whereupon a fine crystalline precipitate was obtained that appeared to be a complex salt of 2.5-dichlor aniline nitrosamine and isobutyl sulfate in equi-molar ratio. This product was filtered from the solution and dried.

The complex salt obtained in the above manner may be mixed with a developer, for example the sodium salt of beta-hydroxy-naphthoic-acid-ortho-toluidide. The mixture, when printed or padded on fibers and treated with acid, for example by passing the printed and dried fibers into contact with acetic acid or carbon dioxide vapors at a temperature of around 100-102° C. followed by a water rinsing, and washing, yields scarlets of a brilliant shade, and of excellent penetration.

*Example 2.*—640 parts of 2.5-dichlor aniline nitrosamine, prepared as in Example 1, were dissolved in 1500 parts of ethyl alcohol and filtered from insoluble inorganic salts. To the thus purified solution was added 175 parts of sodium isobutyl sulfate and about 315 parts of sodium-2,3 - hydroxy - naphthoic - acid - ortho-toluidide. The mixture was stirred until solution was complete and then evaporated to dryness under vacuum. The product was a very pure, readily dispersable and stable printing compound that could be dissolved and made up into printing pastes of good penetration for printing fabrics of any kind. Brilliant shades of exceptional fastness are produced upon development of these pastes by acidic treatment.

*Example 3.*—672 parts of a paste of 5 nitro-2-amino anisol sodium nitrosamine containing an amount of the sodium nitrosamine corresponding to about 168 parts of 5 nitro-2-amino anisol were introduced into 1500 parts cold water and 175 parts of sodium isobutyl sulfate were added. The resultant solution was then heated to about 60° C., whereupon the color of the solution changed from deep yellow to orange. 20 parts of animal carbon black and 225 parts of sodium chloride were then added in order to purify the solution and to assist in salting out the product respectively. Before crystallization of the product the solution was filtered at about 55° C. It was then cooled slowly whereupon a crystalline precipitate was obtained. The precipitate was dried as in Example 1 and may be used in similar manner for printing or dyeing of textiles.

When sodium butyl sulfate or sodium amyl sulfate is substituted for sodium isobutyl sulfate in the procedure of this example, similar products are formed. The compound, which appears to be a complex salt, should be dried without excessive heating and may advantageously be dried with the aid of vacuum at a temperature below 60° C.

*Example 4.*—672 parts of a paste containing the sodium nitrosamine of 4-chlor-2-amino anisol in an amount corresponding to about 168 parts of chlor-amino-anisol, were heated with 162 parts of sodium isopropyl-sulfate to a temperature of 50-60° C. until the sodium isopropyl-sulfate was completely dissolved. 290 parts of the sodium salt of the anilide of 2,3-hydroxy-naphthoic acid were then added with agitation. Agitation was continued while maintaining the temperature between 50 and 60° C. until a homogeneous product was obtained. This product in the form of a paste was then dehydrated by adding 376 parts of anhydrous trisodium phosphate. The dry printing composition thus obtained possesses excellent solubility in water and forms printing pastes of greatly improved stability which, if applied to textile fibers in customary manner, yield very brilliant shades of a bluish red.

*Example 5.*—720 parts of the dry product prepared by dehydrating the sodium nitrosamine of metachlor-aniline with trisodium phosphate as in Example 1 (the dry product containing an amount of sodium nitrosamine corresponding to 97 parts of the meta chlor aniline base and 60 parts of NaOH, equivalent to 146 parts of the sodium nitrosamine), were dissolved in 300 parts of denatured alcohol at a temperature of about 35 to 40° C. The solution was separated from undissolved inorganic compounds and to the separated solution 250 parts of sodium isobutyl-sulfate were added. The solution was then heated to 60 to 65° C. and to the hot solution 292 parts of the sodium salt of the o-toluidide of 2.3-hydroxynaphthoic acid and 1000 parts of denatured alcohol were added. Heating was continued until solution was complete. The alcohol was then evaporated off in vacuum at a temperature below about 40° C. whereupon 748 parts of a fine yellow powder were recovered as distillation residue, the complex product containing about 19.5% of the sodium nitrosamine corresponding to about 15% of meta chlor aniline. The product was very stable possessing high solubility in water.

A suitable printing paste may be prepared from the above product by mixing the following ingredients in the following proportions:

80 parts of the powdered product,
650 parts of a neutral starch tragacanth paste,
220 parts of water,
50 parts of neutral 15% sodium chromate solution.

This paste may be printed on textiles in the usual manner, dried, and developed as in Example 1.

By employing a composition of the above type, developed as described, goods are dyed an orange of superior brilliancy and better fastness, especially to crocking, than a dye prepared in the same manner using the meta chlor aniline nitrosamine salt with the same developer but without the sodium isobutyl sulfate.

If the meta-chlor-aniline is replaced by meta-chlor - toluidine, 2.5-dichloro-1-amino-benzene, 4.5-dichlor-2-amino-1-methyl benzene, or 3-chloro-1-amino-benzene, similar products are obtained.

Likewise, in place of sodium isobutyl-sulfate, an equivalent quantity may be used of another of the partial ester salts of polyhydroxy inorganic acids, such as one of those previously mentioned.

*Example 6.*—600 parts of the paste obtained by treating the diazonium chloride of meta-nitro-paratoluidine with caustic soda and containing about 204 parts of the sodium nitrosamine were diluted at normal temperature with 600 parts denatured alcohol and to the mixture 219 parts of n-butyl-amino-ethyl-sodium-sulfate were added, thereby completeing the solution of the nitrosamine. The solution was then heated gradually to 40° C. and to the hot solution was added a filtered alcoholic solution containing 290 parts of the sodium salt of the anilide of 2.3-hydroxy-naphthoic acid. The product was dried by vacuum distillation, yielding a very fine yellow powder having excellent solubility in water or alcohol. When used in paste such as described in the preceding example, it possesses a high degree of dispersability and superior solubility and good penetration, and yields, upon acidic after-treatment, very brilliant red shades.

Example 7.—600 parts of nitrosamine paste of Example 6 were gradually heated to a temperature of 40 to 50° C. To the hot product, 219 parts of dry n-butyl-amino-ethyl-sodium-sulfate were added and thoroughly mixed. To this mixture 310 parts of the sodium salt of 2.3-hydroxy-naphthoic acid ortho-toluidide were added forming a paste. After thoroughly mixing the ingredients, the paste was allowed to cool to normal temperature and 400 parts of anhydrous trisodium phosphate were added, producng a dry powder. The resultant dry complex printing composition contained an amount of the nitrosamine equivalent to about 13.5% of the meta-nitro-para-toluidine.

Instead of sodium nitrosamine of meta-nitro-para-toluidine, the sodium nitrosamine of benzidine or dianisidine or other nitrosamines derived from aromatic amines may be used, which, when coupled with any suitable developer, will yield an azo coloring matter. Instead of the butyl-amino-ethyl-sodium-sulfate, any of the acid ester-salts herein disclosed as equivalent may be used.

Example 8.—60 parts of an equivalent mixture of the sodium nitrosamine of 2.5-dichlor-aniline and the sodium salt of the toluidide of 2.3-hydroxy-naphthoic acid are dissolved in 300 parts of cold water, to which an additional solvent such as ethyl alcohol or the ethyl ether of glycol may be added, whereupon 40 parts of isobutyl-sodium-sulfate are added until solution is complete. The solution may be heated to a temperature of about 40–50° C. 50 parts of a neutral 15% sodium chromate solution are then added and thickened up with 550 parts of a neutral, or alkaline, starch-tragacanth thickening paste.

The textile material is printed with the above paste, dried, and the color developed directly in a hot acetic acid bath of 1% $CH_3COOH$ concentration, containing 2.5% $Na_2SO_4$ (formic acid mal also be added) or the goods may be passed through an ager, whereupon the above acidic treatment is applied, or the goods may directly be after-treated by passage in an acetic or carbon dioxide ager, which causes full development, then rinsed, soaped, dried, and finished. A well penetrated, very bright scarlet print is thus obtained.

In the above example, any nitrosamine may be employed with any suitable coupling component, such as the dye compositions known under the trade name of Rapid Fast Colors, etc.

Instead of sodium isobutyl sulfate, any soluble acid ester salt herein disclosed may be used in variable quantities.

Example 9.—60 parts of the product obtained in above Example 5 are dissolved in 940 parts cold water to which a very slight amount of any suitable textile gum has been added for the purpose of giving a slight body to the solution.

The textile material is then padded with this solution by means of an ordinary 3 roller padding machine, then dried, preferably in a hot air drier. The goods are then after-treated by either method outlined in Example 8, rinsed, dried, and finished. A very brilliant reddish-orange dyed material is thus obtained, which shows remarkable fastness properties.

As a variation of the above dyeing process, a dye-padding liquor may be prepared by dissolving, preferably, equivalent quantities of any nitrosamine with any suitable coupling component in a small amount of water, then adding a suitable amount of any inorganic polyhydroxy-acid partial ester salt herein disclosed, heating the solution to a temperature of about 60° C. for a short while, thereupon diluting this solution with water, which may contain a thickening agent, to the proper concentration. The solution may then be used for padding in the above manner.

In its broader aspects, the invention comprises inorganic acid ester salts of the various types disclosed herein. More particularly, the salts of lower alkyl acid esters are preferred, especially the hydrocarbon-alkyl acid ester salts, i. e., those derived from hydroxy-substituted hydrocarbons.

Compositions comprising nitrosamines merely mechanically admixed with ester salts of polybasic inorganic acids and in which mixtures the stability of the nitrosamine is not improved by the presence of the ester salt are not claimed herein. Such compositions are claimed in my co-pending application Serial No. 252,217 of January 21, 1939.

I claim:

1. A stable dye product which comprises the reaction product of an aromatic nitrosamine having the general formula Ar(NNO)Me, where Ar represents the residue of a diazotizable amine of the benzene, naphthalene, anthracene, or carbazole series, and Me represents the residue of an organic or an inorganic base, with an alkali-metal salt of an acid ester having the formula $R_z$—A—$M_{n-z}$, wherein R is an alcohol residue containing not more than 5 carbon atoms in the alkyl nucleus, A represents the hydrogen-free radical of a polyhydroxy inorganic acid, $n$ designates the number of replaceable acidic hydrogen atoms present in the polyhydroxy acid and has the value 2, 3, or 4, $z$ represents an integer smaller than $n$, and M represents alkali-metal.

2. A dye composition comprising an alkali-metal salt of a coupling component and the reaction product of an aromatic nitrosamine having the general formula Ar(NNO)Me, where Ar represents the residue of a diazotizable amine of the benzene, naphthalene, anthracene, or carbazole series and Me represents the residue of an organic or inorganic base, with an alkali-metal salt of an acid ester having the formula $R_z$—A—$M_{n-z}$, wherein R is an alcohol residue containing not more than five carbon atoms in the alkyl nucleus, A represents the hydrogen-free radical of a polyhydroxy inorganic acid, $n$ designates the number of replaceable acidic hydrogen atoms present in the polyhydroxy acid and has the value 2, 3, or 4, $z$ represents an integer smaller than $n$, and M represents alkali-metal.

3. The method of forming a stable dye product, which comprises heating a solution of an aromatic nitrosamine with a solution of an alkali-metal salt of an acid, polyhydroxy inorganic acid ester of an alcohol of the group consisting of alkyl, cyclo-alkyl, and aralkyl alcohols containing not more than five carbon atoms in the alkyl group.

4. The method of forming a stable dye product, which comprises heating a solution of an aromatic nitrosamine and a soluble metal salt of an acid, sulfuric acid ester of an alcohol of the group consisting of alkyl, cyclo-alkyl, and aralkyl alcohols containing not more than five carbon atoms in the alkyl group.

5. The method of forming a stable dye product, which comprises heating together an alkali metal alkyl sulfate containing not more than five carbon atoms in the alkyl nucleus and a nitrosamine having the general formula Ar(NNO)Me, where Ar represents the residue of a diazotizable amine of the benzene series and Me represents an alkali metal.

6. The method of forming a stable dye product which comprises heating a nitrosamine having the general formula Ar(NNO)Na, where Ar represents the residue of a diazotizable amine of the benzene series, together with a sodium salt of an acid ester of an inorganic acid and a hydrocarbon-alkyl alcohol containing not more than 5 carbon atoms in the alkyl group.

7. The method of forming a stable dye product which comprises heating a nitrosamine having the general formula Ar(NNO)Na, where Ar represents the residue of a diazotizable amine of the benzene series, together with a sodium butyl sulfate.

8. A dye powder comprising the reaction product of a nitrosamine having the general formula Ar(NNO)Na, where Ar represents the residue of a diazotizable amine of the benzene series, with a sodium salt of an acid ester of an inorganic acid and a hydrocarbon-alkyl alcohol containing not more than 5 carbon atoms in the alkyl group.

9. A dye composition comprising the reaction product of a nitrosamine having the general formula Ar(NNO)Na, where Ar represents the residue of a diazotizable amine of the benzene series, with a sodium salt of an acid ester of an inorganic acid and a hydrocarbon-alkyl alcohol containing not more than 5 carbon atoms in the alkyl group, and a sodium salt of a coupling component.

10. A stable dye product which comprises the reaction product of sodium 2.5 dichlor-aniline-nitrosamine and sodium isobutyl sulfate.

11. A stable dye product which comprises the reaction product of 5 nitro-2-amino-anisol-sodium-nitrosamine and sodium isobutyl sulfate.

12. A stable dye product which comprises the reaction product of 4-chlor-2-amino-anisol-sodium-nitrosamine and sodium isopropyl sulfate.

13. A dye composition comprising the reaction product of 2.5 di-chlor-aniline-sodium-nitrosamine and sodium isobutyl sulfate, mixed with sodium 2.3-hydroxy-naphthoic-acid-ortho-toluidide.

14. In the dyeing of textile fibers, the improvement which comprises applying thereto the reaction product of an aromatic nitrosamine with a soluble metal salt of an acid, inorganic acid ester of an alcohol of the group consisting of alkyl, cyclo-alkyl, and aralkyl alcohols containing not more than five carbon atoms in the alkyl group.

15. In the dyeing of textile fibers the improvement which comprises applying thereto the reaction product of an aromatic nitrosamine having the general formula Ar(NNO)Me, where Ar represents the residue of a diazotizable amine of the benzene, naphthalene, anthracene, or carbazole series and Me represents the residue of an organic or inorganic base, with an alkali metal salt of an acid ester having the formula $R_z$—A—$M_{n-z}$ wherein R is an alcohol residue containing not more than five carbon atoms in the alkyl nucleus, A represents the hydrogen-free radical of a polyhydroxy inorganic acid, $n$ designates the number of replaceable acidic hydrogen atoms present in the polyhydroxy acid and has the value 2, 3, or 4, $z$ represents an integer smaller than $n$, and M represents alkali metal.

16. The method of dyeing textile fibers which comprises applying thereto the reaction product of a nitrosamine having the general formula Ar(NNO)Na, where Ar represents the residue of a diazotizable amine of the benzene series, with a sodium salt of an acid ester of an inorganic acid and a hydrocarbon-alkyl alcohol containing not more than 5 carbon atoms in the alkyl group, and developing it on the fibers.

17. The method of dyeing textile fibers which comprises applying thereto a composition comprising a sodium salt of a coupling component and the reaction product of a nitrosamine having the general formula Ar(NNO)Na, where Ar represents the residue of a diazotizable amine of the benzene series, with a sodium salt of an acid ester of an inorganic acid and a hydrocarbon-alkyl alcohol containing not more than 5 carbon atoms in the alkyl group, and subjecting the fibers to an acid development.

18. A stable dye product which comprises the reaction product of an aromatic nitrosamine having the general formula Ar(NNO)Me, wherein Ar represents the residue of a diazotizable aromatic amine and Me represents the residue of an organic or an inorganic base, with a soluble salt of an acid ester having the formula $R_z$—A—$H_{n-z}$, wherein R represents an alcohol residue containing a total number of carbon atoms not more than 16, A represents the hydrogen-free radical of a polyhydroxy inorganic acid, $n$ designates the number of replaceable acidic hydrogen atoms present in the polyhydroxy acid and has the value 2, 3, or 4, and $z$ represents an integer smaller than $n$.

19. A stable dye product which comprises the reaction product of an aromatic nitrosamine having the general formula Ar(NNO)Me, wherein Ar represents the residue of a diazotizable aromatic amine and Me represents the residue of an organic or an inorganic base, with a soluble salt of an acid ester having the formula $R_z$—A—$H_{n-z}$, wherein R represents a hydrocarbon alcohol residue, A represents the hydrogen-free radical of a polyhydroxy inorganic acid, $n$ designates the number of replaceable acidic hydrogen atoms present in the polyhydroxy acid and has the value 2, 3, or 4, and $z$ represents an integer smaller than $n$.

20. A stable dye product which comprises the reaction product of an aromatic nitrosamine having the general formula Ar(NNO)Me, wherein Ar represents the residue of a diazotizable aromatic amine and Me represents the residue of an organic or an inorganic base, with a soluble salt of an acid ester having the formula $R_z$—A—$H_{n-z}$, wherein R represents an alcohol residue, the alkyl group of which is saturated, containing a total number of carbon atoms not more than 16, A represents the hydrogen-free radical of a polyhydroxy inorganic acid, $n$ designates the number of replaceable acidic hydrogen atoms present in the polyhydroxy acid and has the value 2, 3, or 4, and $z$ represents an integer smaller than $n$.

21. The method of forming a stable dye product, which comprises heating a solution of an aromatic nitrosamine having the general formula Ar(NNO)Me, wherein Ar represents the residue of a diazotizable aromatic amine and Me represents the residue of an organic or an inorganic base, and a soluble salt of an acid ester having the formula $R_z$—A—$H_{n-z}$, wherein R represents an alcohol residue containing a total number of carbon atoms not more than 16, A represents the hydrogen-free radical of a polyhydroxy inorganic acid, $n$ designates the number of replaceable acidic hydrogen atoms present in the polyhydroxy acid and has the value 2, 3, or 4, and $z$ represents an integer smaller than $n$.

22. The method of forming a stable dye product, which comprises heating a solution of an aromatic nitrosamine having the general formula Ar(NNO)Me, wherein Ar represents the residue of a diazotizable aromatic amine and Me represents the residue of an organic or an inorganic base, and a soluble salt of an acid ester having the formula $R_z$—A—$H_{n-z}$, wherein R represents a hydrocarbon alcohol residue, A represents the hydrogen-free radical of a polyhydroxy inorganic acid, $n$ designates the number of replaceable acidic hydrogen atoms present in the polyhydroxy acid and has the value 2, 3, or 4, and $z$ represents an integer smaller than $n$.

23. The method of forming a stable dye product, which comprises heating a solution of an aromatic nitrosamine having the general formula Ar(NNO)Me, wherein Ar represents the residue of a diazotizable aromatic amine and Me represents the residue of an organic or an inorganic base, and a soluble salt of an acid ester having the formula $R_z$—A—$H_{n-z}$, wherein R represents an alcohol residue, the alkyl group of which is saturated, containing a total number of carbon atoms not more than 16, A represents the hydrogen-free radical of a polyhydroxy inorganic acid, $n$ designates the number of replaceable acidic hydrogen atoms present in the polyhydroxy acid and has the value 2, 3, or 4, and $z$ represents an integer smaller than $n$.

24. A dye composition comprising a soluble salt of a coupling component and the reaction product of an aromatic nitrosamine having the general formula Ar(NNO)Me, wherein Ar represents the residue of a diazotizable aromatic amine and Me represents the residue of an organic or an inorganic base, with a soluble salt of an acid ester having the formula $R_z$—A—$H_{n-z}$, wherein R represents an alcohol residue containing a total number of carbon atoms not more than 16, A represents the hydrogen-free radical of a polyhydroxy inorganic acid, $n$ designates the number of replaceable acidic hydrogen atoms present in the polyhydroxy acid and has the value 2, 3, or 4, and $z$ represents an integer smaller than $n$.

25. A dye composition comprising a soluble salt of a coupling component and the reaction product of an aromatic nitrosamine having the general formula Ar(NNO)Me, wherein Ar represents the residue of a diazotizable aromatic amine and Me represents the residue of an organic or an inorganic base, with a soluble salt of an acid ester having the formula $R_z$—A—$H_{n-z}$, wherein R represents a hydrocarbon alcohol residue, A represents the hydrogen-free radical of a polyhydroxy inorganic acid, $n$ designates the number of replaceable acidic hydrogen atoms present in the polyhydroxy acid and has the value 2, 3, or 4, and $z$ represents an integer smaller than $n$.

26. A dye composition comprising a soluble salt of a coupling component and the reaction product of an aromatic nitrosamine having the general formula Ar(NNO)Me, wherein Ar represents the residue of a diazotizable aromatic amine and Me represents the residue of an organic or an inorganic base, with a soluble salt of an acid ester having the formula $R_z$—A—$H_{n-z}$, wherein R represents an alcohol residue the alkyl group of which is saturated, containing a total number of carbon atoms not more than 16, A represents the hydrogen-free radical of a polyhydroxy inorganic acid, $n$ designates the number of replaceable acidic hydrogen atoms present in the polyhydroxy acid and has the value 2, 3, or 4, and $z$ represents an integer smaller than $n$.

27. The method of dyeing textile fibers, which comprises applying thereto the reaction product of an aromatic nitrosamine having the general formula Ar(NNO)Me, wherein Ar represents the residue of a diazotizable aromatic amine and Me represents the residue of an organic or an inorganic base, with a soluble salt of an acid ester having the formula $R_z$—A—$H_{n-z}$, wherein R represents an alcohol residue containing a total number of carbon atoms not more than 16, A represents the hydrogen-free radical of a polyhydroxy inorganic acid, $n$ designates the number of replaceable acidic hydrogen atoms present in the polyhydroxy acid and has the value 2, 3, or 4, and $z$ represents an integer smaller than $n$, and developing it on the fibers.

28. The method of dyeing textile fibers, which comprises applying thereto the reaction product of an aromatic nitrosamine having the general formula Ar(NNO)Me, wherein Ar represents the residue of a diazotizable aromatic amine and Me represents the residue of an organic or an inorganic base, with a soluble salt of an acid ester having the formula $R_z$—A—$H_{n-z}$, wherein R represents a hydrocarbon alcohol residue, A represents the hydrogen-free radical of a polyhydroxy inorganic acid, $n$ designates the number of replaceable acidic hydrogen atoms present in the polyhydroxy acid and has the value 2, 3, or 4, and $z$ represents an integer smaller than $n$, and developing it on the fibers.

29. The method of dyeing textile fibers, which comprises applying thereto the reaction product of an aromatic nitrosamine having the general formula Ar(NNO)Me, wherein Ar represents the residue of a diazotizable aromatic amine and Me represents the residue of an organic or an inorganic base, with a soluble salt of an acid ester having the formula $R_z$—A—$H_{n-z}$, wherein R represents an alcohol residue, the alkyl group of which is saturated, containing a total number of carbon atoms not more than 16, A represents the hydrogen-free radical of a polyhydroxy inorganic acid, $n$ designates the number of replaceable acidic hydrogen atoms present in the polyhydroxy acid and has the value 2, 3, or 4, and $z$ represents an integer smaller than $n$, and developing it on the fibers.

JEAN G. KERN.